Figure 8:
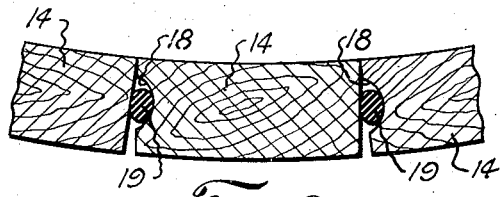

July 25, 1944.   J. P. WALKER   2,354,342
JOINTS FOR THE WALLS OF VESSELS
Filed April 14, 1941   3 Sheets-Sheet 1
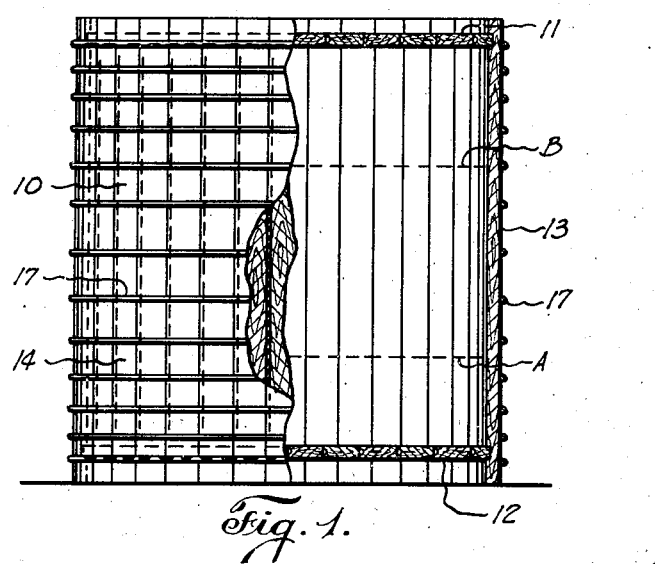
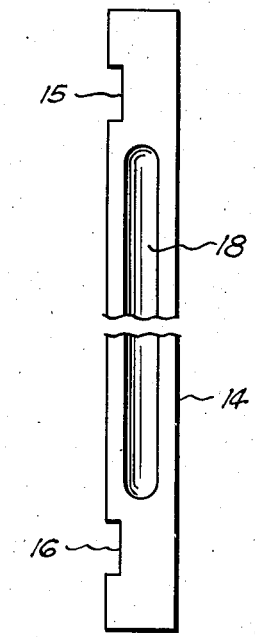
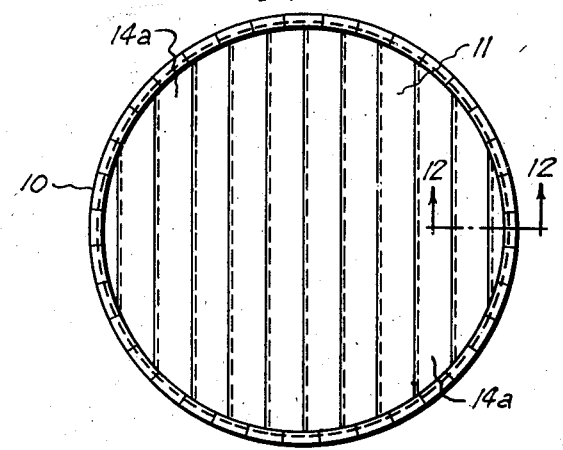
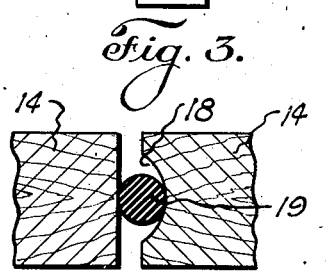
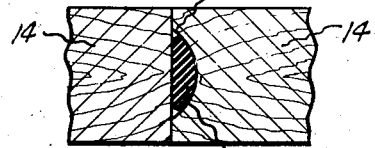
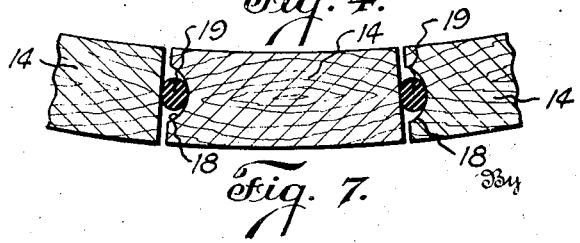
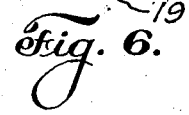
Inventor
Jay P. Walker
Attorney July 25, 1944. J. P. WALKER 2,354,342
JOINTS FOR THE WALLS OF VESSELS
Filed April 14, 1941 3 Sheets-Sheet 2

Inventor
Jay P. Walker
By
Jack A. Athley
Attorney

July 25, 1944.  J. P. WALKER  2,354,342
JOINTS FOR THE WALLS OF VESSELS
Filed April 14, 1941    3 Sheets—Sheet 3

Inventor
Jay P. Walker
By
Attorney

Patented July 25, 1944

2,354,342

UNITED STATES PATENT OFFICE 2,354,342

JOINT FOR THE WALLS OF VESSELS

Jay P. Walker, Tulsa, Okla., assignor of forty per cent to Guy O. Marchant and six per cent to C. G. Wells, both of Tulsa, Okla.

Application April 14, 1941, Serial No. 388,474

5 Claims. (Cl. 217—96)

This invention relates to new and useful improvements in joints for the walls of vessels.

Heretofore, considerable difficulty has been encountered in efficiently sealing or packing off the joints of vessels and wooden tanks, particularly those used for storing liquids which are subject to vaporization. In arid climates, the exterior of the tank staves, or the parallel members of wooden vessels, will dry out and shrink in width, whereby the outer edges of adjacent staves will be spaced from each other. Continued drying of the staves or members will result in further shrinkage of said staves and enlargement of the size of the joint therebetween, until the inner edges of the staves are eventually spaced from each other, thereby permitting a leak. In cooler climates, the hot summer sun has the same effect upon the staves of wooden tanks and vessels.

It has been found that the majority of leaks occur at the central or intermediate portion of an upright joint rather than at or near the ends thereof. This is, in part, due to the fact that the upper and lower portions of the tank are relatively rigid and not subject to movement. However, the chief cause of leaks at this point, in crude oil storage tanks, is that the hot gases vaporized from the liquid will dry and space the interior edges of the staves at the same time that the drying sun or climate is spacing the external edges of said staves so as to spread the joints therebetween at a rapid rate. When this occurs, liquid will commence to leak through the enlarged joints at the liquid level which will be at the lower portion of such enlargement. Since fluids, such as crude oil, stratify in accordance with their specific gravity when permitted to stand, the tank will usually contain water in the lower portion, oil in the intermediate portion and vapor or gas in the upper portion thereof. Each of these fluids have a different effect upon the joints of a wooden tank and accentuate the problem of efficiently sealing said joints, due to the fact that the shrinkage of the staves varies with each portion or zone of the tank. This is readily apparent when it is realized that the fluids introduced into the tank quite often have a temperature of 180° F., or higher. To overcome these difficulties, various types of gaskets or packings as well as water-filled joints have been used with little or no success. Although the latter have proven to be more practicable than the former, the expense and trouble of maintaining the joints in a moistened condition outweigh the favorable results obtained from the same. Also in arid climates, an adequate water supply is a major problem and, often, it is impossible or very expensive to obtain a sufficient quantity of water.

In addition to the difficulties hereinbefore set forth, tanks having diameters of from 12 to 30 feet are subject to considerable wind stress and vibration, as well as breathing action caused by the filling and emptying of the tanks which may occur quite frequently and many times during a month. The wind stress alone sometimes causes inward deflections of the tank staves and vibration of the tank, especially when the same is completely or substantially empty, which is very detrimental to said tank. Thus, it is readily apparent that climatic conditions enhance the possibility of enlargement of the size of the joints between the staves of the tanks which are seldom under cover.

However, the greatest factor contributing to the enlargement of these joints is the elongation of the metallic tank hoops or tie rods, due to thermal expansion, coupled with the natural shrinkage of the wooden tank staves which together cause early failure of non-sealed or even wetted joints, since there is nothing between the joints to off-set or compensate for the detrimental effects of the metal expansion and wood shrinkage. Of course, the tie rods or tank hoops are also subject to thermal contraction in cold weather, thereby materially shortening the length of said rods or hoops and tightening the joints with a consequent destruction of the ordinary sealing means, unless sufficient space is provided for the deformation thereof so as to avoid any grinding or pinching off of said sealing means.

Therefore, one object of the invention is to provide improved means for efficiently and economically sealing the joints of wooden tanks or vessels, whereby the occurrence of leaks is substantially eliminated.

An important object of the invention is to provide an improved sealing means arranged to be disposed within the joint of a wooden tank for packing off the same irrespective of the size of said joint, whereby the natural shrinkage of the staves of the tank and spreading of the joints is compensated for to prevent leakage of the contents of said tank.

Another object of the invention is to provide an improved deformable sealing member which is adapted to co-act with the abutting surfaces of tank staves so as to pack-off the space or joint therebetween, one or both of the stave surfaces being recessed to receive the sealing member, whereby said member will be deformed or distorted into sealing position when said stave surfaces are drawn together.

A particular object of the invention is to provide an improved sealing member of the character described, which is particularly adapted to pack-off wooden tank joints of uneven or varying cross-sectional area, thereby compensating for unequal shrinkage throughout the length or height of each tank stave.

A further object of the invention is to provide an improved resilient sealing member which is of less cross-sectional area than the recess or recesses within which it engages so that adequate space is provided for the distortion or flowing of the member into sealing position, said recess or recesses also being of greater length than said member so as to permit elongation or longitudinal displacement of the member upon distortion of the same.

Still another object of the invention is to provide an improved deformable sealing member, which will deform or flow to its original packing-off position when the metallic tie rods or tank hoops are shortened due to thermal contraction and the size of the joints is decreased by the swelling of the wooden staves caused by rain or wetting of said staves, as well as expand to compensate for the enlargement of the joints during normal conditions, whereby leakage or seepage of the contents of the tank through the joints is prevented under all circumstances and conditions.

A still further object of the invention is to provide an improved tank joint, of the character described, which includes sealing means and an ample space for accommodating said sealing means to permit swelling of the tank staves and contraction of the tie rods or tank hoops without pinching off or otherwise destroying any portion of the sealing means.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a view, partly in elevation and partly in section, of a wooden tank having sealing members disposed within the joints thereof in accordance with the invention, Figure 2 is a plan view of the tank with the sealing members disposed within the joints of the deck staves, Figure 3 is a partial elevation of one of the tank staves, showing the recess formed therein for receiving one of the sealing members, Figure 4 is a horizontal, cross-sectional view of a portion of the tank, showing the adjacent surfaces of the staves in abutment and the sealing members in packing-off position, Figure 5 is an enlarged, horizontal, cross-sectional view of one of the joints in its spread position, with the sealing member undistorted, Figure 6 is a view, similar to Figure 5, of the joint after the staves have been drawn together so as to distort the member into sealing position, Figure 7 is a view, similar to Figure 4, showing the sealing members undistorted and the staves spread, Figure 8 is a similar view, showing the exterior of the staves shrunk in width so as to enlarge the outer portion of the joints.

Figure 9:
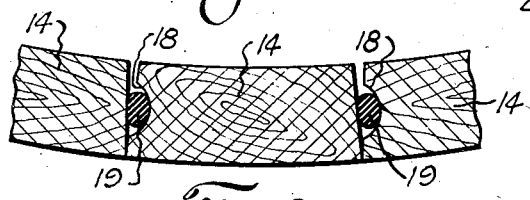
Figures 15, 16:
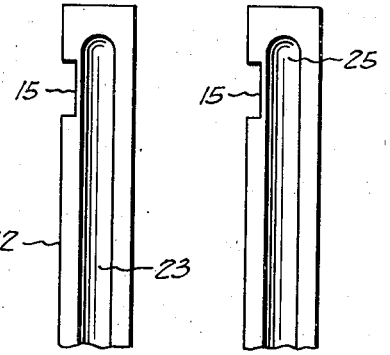
Figure 10:
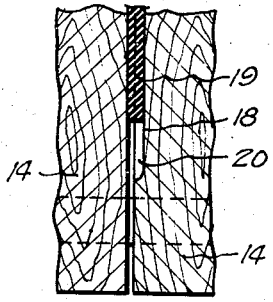
Figure 11:
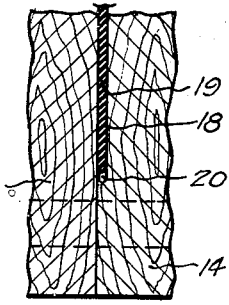
Figure 12:
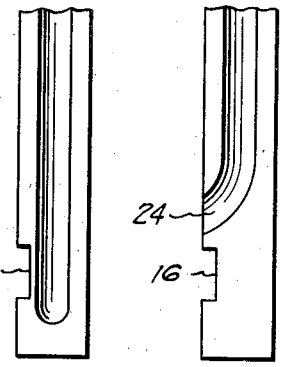
Figure 13:
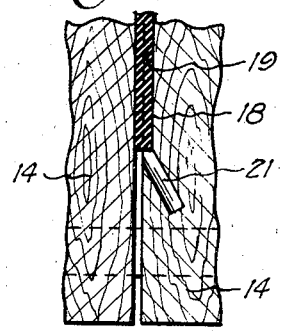
Figure 14:
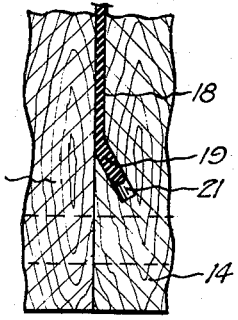
Figure 17:
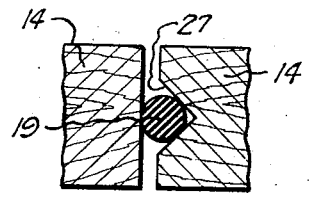
Figure 18:
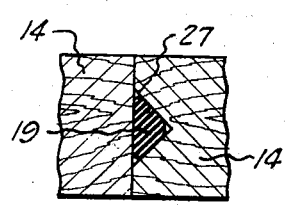
Figure 25:
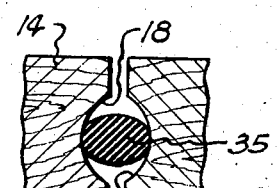
Figure 19:
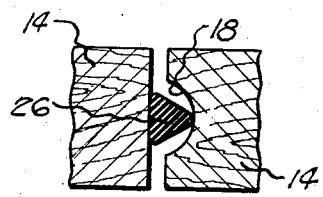
Figure 20:
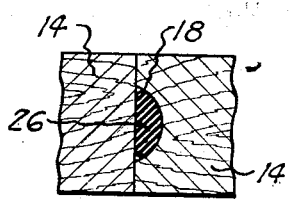
Figure 26:
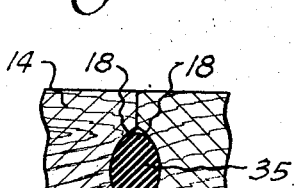
Figure 21:
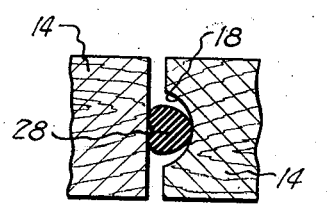
Figure 22:
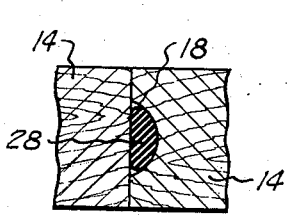
Figure 23:
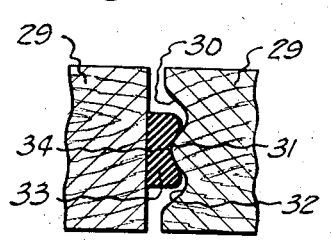
Figure 24:
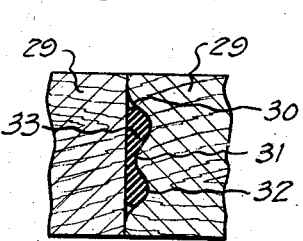

Figure 9 is a similar view, showing the inner portion of the joints enlarged by shrinkage of the interior of the staves, Figure 10 is a transverse, vertical, sectional view of the lower portion of a joint, showing the excess length of the recess for permitting elongation of the sealing member, Figure 11 is a transverse, vertical, sectional view, showing the staves in abutment and the sealing member in packing-off position and elongated within the recess, Figure 12 is a transverse, vertical, sectional view, taken on the line 12—12 of Figure 2, Figure 13 is a view, similar to Figure 10, showing a modified form of recess for permitting elongation of the member, Figure 14 is a view, similar to Figure 11, of the modified form, Figure 15 is a partial elevation of a tank stave having its recess extending above and below the upper and lower crozes, Figure 16 is a view similar to Figure 15, of another stave having a modified form of recess therein, Figure 17 is a horizontal, cross-sectional view, showing the sealing member in a modified form of recess and its undistorted position, Figure 18 is a view, similar to Figure 17, showing the member distorted into sealing position, Figures 19 and 20 are views, similar to Figures 17 and 18, of a modified form of sealing member within the first form of recess, Figures 21 and 22 are similar views, showing another form of sealing member, Figures 23 and 24 are similar views, showing another form of sealing member and recess, and Figures 25 and 26 are similar views, showing still another form of member and recesses in both staves.

In the drawings, the numeral 10 designates a wooden tank having a top or deck 11, a bottom 12 and a side or wall 13. The latter is constructed of a plurality of upright or vertical staves 14 which are formed in the usual manner of relatively thick lumber and have upper crozes 15 for receiving the top or deck 11 and lower crozes 16 for receiving the bottom 12. The staves 14 are held in position with their adjacent surfaces or edges abutting each other by a plurality of annular tie rods or tank hoops 17. It is desirable that the uppermost and lowermost rods be formed of heavier and stronger material than the other rods (Figure 1) or be more numerous and more closely spaced so as to insure snug joints between the crozes of the staves and the deck and bottom of the tank, as well as to permit the drawing together of the joints of the deck and bottom staves which present additional resistance to the formation of snug joints at these points.

To prevent leakage of the joints of the tank wall, an elongate groove or recess 18 is formed in one of the abutting surfaces or edges of each stave 14 for receiving a cylindrical, resilient sealing member 19 of rubber, synthetic rubber or other suitable relatively-soft material. Each groove 18 extends longitudinally of its stave and, preferably, terminates short of the crozes 15 and 16 of said stave as shown in Figure 3. The contour or shape of the groove is unimportant so long as the same differs sufficiently from that of the sealing member 19 and is of sufficient area to accommodate distortion of said member when adjacent staves are drawn together, whereby the member will flow into sealing position within said groove and will substantially fill the same. However, it has been found most satisfactory and desirable by experiments to employ a groove, which is arcuate and shallow in cross-section as shown in Figure 5, with a cylindrical sealing member. It is noted that the groove 18 is swung on an arc having a radius greater than the diameter of the member 19, whereby the cross-sectional area of said groove exceeds the cross-sectional area of said memer to accommodate and permit complete distortion thereof as shown in Figure 6.

It is pointed out that the deck or top 11 and the bottom of the tank, which are formed of staves 14a in the same manner as the side or wall 13, may also have their joints sealed in the same manner. As shown in Figure 12, each stave 14a has an elongate recess 18a, similar to the grooves 18 of the staves 14, formed in one of the abutting edges or surfaces thereof. A cylindrical sealing member 19a which is similar to the member 19 is adapted to engage within each recess 18a and engage the edge of the adjacent staves so as to seal or pack off the joint between the staves in the same manner as said member 19. The use of the sealing members 19a is especially desirable between the joints of the deck staves since the same are constantly exposed to the weather.

When the groove or recess of each stave contains a sealing member (Figure 7) and the staves are drawn together by tightening the rods 17, the adjacent surfaces or edges of said staves will be contiguous and the members will be distorted into sealing position as shown in Figure 4. Due to the greater cross-sectional area of the grooves, it is manifest that the sealing members will not completely fill said grooves when the staves are in engagement, whereby it is assured that the entire area of said members will be under tension and will remain in a live condition. Thus, there will be no possibility of a portion of the members being pinched or sloughing off. At the time the tank is first erected, the staves and sealing members will be in the position shown in Figure 4 and said members will prevent any possibility of the joints of the tank wall or side leaking. When the tank is employed to store crude oil, which may be sour and/or which may be at an extremely high temperature, the water in said oil will settle to the bottom of said tank as shown by the dotted line A in Figure 1. The oil level will be above the water level as shown by the dotted line B, while the vapors or gases collect in the tank thereabove. The positions of the levels will, of course, vary with the quantity of fluid in the tank, as well as with constituents of the fluid, and the ratio of said constituents to one another.

After the tank has been put into use, the aridity of the locale of said tank and/or the hot sun will dry out or dehydrate the exterior of the staves of the tank. This removal of moisture will cause the external portion of the staves to shrink transversely, whereby the width of said staves will be reduced and the outer edge portions of the same will be spaced from each other as shown in Figure 8. Continued drying of the staves will cause the internal portion of the joint to be enlarged due to the shrinkage in width of the inner portion of the staves. In extreme cases, the shrinkage of the staves might be so great that the joints will be enlarged to the extent shown in Figure 7, prior to the retightening of the bands 17. Due to the resiliency of the sealing members 19 and the fact that the same are under tension, said members will return or revert toward their undeformed position upon shrinkage of the staves so as to seal the joints therebetween. The extent of the distortion of the members will be dependent upon the position of the staves and may be only partial, as is clearly shown in Figures 7 and 8. Thus, the joints will be sealed under all normal conditions, although the pressure exerted upon the sealing members may vary from time to time. Although the sealing members are primarily designed to seal the joints of the tank so as to prevent a leak only until the bands or tie rods can be tightened, it is noted that said members will seal the joints to the extent of their elasticity or resiliency for an unlimited time.

Attention is directed to the fact that wooden tanks have an inherent tendency to leak at the intermediate portion of the staves rather than at the ends thereof. Although this may be due to the flexibility of the midportion of the tank wall or side, wind stress or vibration caused by filling and emptying the tank, it is believed that the same is largely due to the fact that the empty portion of the tank above the oil level B exposes each stave to the drying effect of the gases or vapors adjacent thereto. This is especially true of tanks used for settling oil which has been heated, since usually only the extreme upper portion of the walls or sides of such tanks are constantly exposed to the gases or vapors, the underside of the tank deck seldom, if ever, being contacted by oil or water. This drying out of the inner surfaces of the staves will result in a shrinkage in width of the same and an enlargement of the inner portion of the joints, as is clearly shown in Figure 9. In the conventional wooden tank, this shrinkage of the inner portions of the sidewall and deck staves above the oil level, coupled with the external shrinkage of said staves (Figure 8) will result in a plurality of leaks at the oil level B and thereabove, with a consequent loss of oil as well as of gas or vapors.

Obviously, these leaks will not occur in a tank which is constructed in accordance with this invention, because the joints thereof will be sealed by the members 19. Spreading or enlargement of the joints will permit flowing or reversion of the distorted sealing members, which have been maintained under tension and in a live condition, toward their undistorted positions, as has been hereinbefore explained. It is pointed out that the shrinkage of the inner and outer portions of the deck and sidewall staves is usually uneven or unequal and the same is true of the upper and lower portions of said sidewall staves both as to the exterior and interior thereof. Since the lower portion of the tank below the dotted line A, which tank may be a settling tank, but not necessarily so, contains water, there will be little or no shrinkage of the lower interior portion of the staves. Likewise, the interior intermediate portion of the staves below the dotted line B, will remain in snug engagement and the joints will not be enlarged due to the continuous contact of oil with said staves. As has been hereinbefore set forth, the vapors or gases within the upper portion of the tank, above the oil level B, will dry out and shrink the inner surfaces of the staves. The sun or an arid climate will remove the moisture from the exterior upper and intermediate portions of the staves, while the lower outer portions of the staves will be maintained substantially in their original position by the water in the tank and the moisture in the ground. Thus, a cross-section of the upper portion of the tank wall will have an appearance similar to that shown in Figure 7. The intermediate portion of the tank wall in cross-section will resemble Figure 8, while a sectional view of the lower portion of said wall will be substantially the same as the disclosure of Figure 4 due to the water saturation and swelling of the lower portion of the staves and the additional or stronger tie rods.

From the foregoing, it is readily apparent that the cross-sectional area of the tank wall joints is subject to variation and that the sealing members must be sufficiently resilient to compensate for such variation. Since the sealing members are constantly under tension, they will follow the movement of the staves by attempting to revert to their undistorted position and will continue their sealing engagement with the edges of said staves. In order to permit complete distortion of each sealing member, its groove 18 is formed of greater length than the member as shown by the numeral 20 in Figure 10. Thus, any necessary elongation of the member upon distortion of the same is accommodated (Figure 11). If desired, an inwardly and downwardly inclined, cylindrical recess 21 may be formed in each stave so as to form a continuation of its groove (Figure 13), whereby the elongation of the sealing member will be taken care of (Figure 14). As shown in Figure 15, a stave 22 having a groove 23 of such length that it extends beyond the upper and lower crozes thereof may be substituted for the stave 14 with its groove 18. Any elongation of the sealing members may also be accommodated by having the lower portion of each groove inclined downwardly toward and communicating with the interior of the tank as shown by the numeral 24 in Figure 16. The upper portion 25 of the groove may, if desired, extend above the upper croze of the stave.

As has been hereinbefore explained, the particular shapes of the sealing member 19 and grooves 18 are immaterial so long as said members are of less cross-sectional area than said grooves. A sealing member 26, which is substantially triangular in cross-section so as to have three longitudinal surfaces, may be substituted for the cylindrical member 19 (Figure 19). This shape of member is readily distortable within the groove 18 of the stave 14 as shown in Figure 20. The cylindrical sealing member 19 may also be used with efficient results in a groove 27 which is triangular or V-shaped in cross-section (Figures 17 and 18). As is clearly shown in Figures 21 and 22, the groove 18 is also adapted to receive a heart-shaped sealing member 28.

In some installations, it might be desirable to employ a stave 29 having a double groove or recess 30 formed in one edge thereof as shown in Figure 23. The groove is provided with a central longitudinal rib or shoulder 31 which divides the same into a pair of parallel longitudinally-extending channels 32. A relatively wide sealing member 33, having a shallow longitudinal depression 34 formed in one of its surfaces, is adapted to be received by the groove 30. When the staves 29 are drawn together, the central rib 31 of the groove 30 will engage the depression 34 of the member 33 to distort and force said member into the channels 32, whereby the joint between said staves will be sealed as shown in Figure 24.

The groove 18 may be formed in each edge of the stave 14 as shown in Figure 25, whereby the same will receive a sealing member 35 which is substantially elliptical in cross-section. As shown in Figure 26, the combined cross-sectional area of the grooves 18 is greater than the cross-sectional area of the member 35 so as to accommodate the same in its distorted position. The same is true of the other sealing members and grooves which have been described hereinbefore, as it is very important that there be no pinching or sloughing off of said members when the staves are in snug engagement or when the tie rods are tightened after external expansion of the same and shrinkage of said staves. Since the sealing members are constantly under tension, the same will revert or flow toward their undeformed position upon enlargement of the joints so as to maintain their sealing engagement with the staves. Of course, the extent of this reversion or flowing of the members is controlled by the elastic or resilient limits thereof.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A wooden storage vessel including, upright staves disposed circumferentially of the vessel and having vertical edges adapted to contact, said staves having self-sealing joints therebetween, each including a packing recess formed by at least one groove extending longitudinally between adjacent vertical edges of said staves, and a solid elastic packing element in said recess having a cross-sectional shape different from the cross-sectional shape of the recess when the staves are in maximum contact and a cross-sectional area less than the cross-sectional area of the recess when the staves are in maximum contact, the cross-sectional diameter of the packing element circumferentially of the vessel being greater when undeformed than the cross-sectional diameter of the recess circumferentially of the vessel when the staves are in maximum or minimum contact, whereby the recess provides additional deforming space for the packing element when the stave edges are in maximum contact and the element is fully deformed thereby so that said element remains elastic and also whereby sealing contact is maintained between the packing element and the staves during expansion and contraction of the joint.

2. A wooden vessel stave joint as set forth in claim 1 wherein the depth of the recess is less than its greatest transverse dimension so that additional deforming space is provided laterally and vertically of the packing element when the edges of the staves are in maximum contact and the element is fully deformed by the staves.

3. A wooden vessel stave joint as set forth in claim 1, wherein the recess is formed by a groove in only one vertical edge of one of the staves forming a joint and the adjacent vertical stave edge is flat.

4. A wooden vessel stave joint as set forth in claim 1, wherein the edge of the stave opposite the stave receiving the packing is provided with a recess for receiving a portion of the packing element projecting from the first named recess.

5. A wooden vessel stave joint as set forth in claim 1 wherein the packing element is initially free in the recess so that portions thereof may deform into contact with the wall of the recess and retract therefrom.

JAY P. WALKER.